PRODUCTION OF MAGNETIC SOUND TAPE

Original Filed Dec. 21, 1950

William C. Speed
James J. Dwyer
INVENTORS
BY
Pennie, Edmonds, Morton & Barrows
ATTORNEYS

PRODUCTION OF MAGNETIC SOUND TAPE

Original Filed Dec. 21, 1950

4 Sheets-Sheet 2

INVENTORS
William C. Speed
James J. Dwyer
BY
Pennie, Edmonds, Morton & Barrows
ATTORNEYS INVENTORS
William C. Speed
James J. Dwyer
BY
Pennie, Edmonds, Morton & Barrows
ATTORNEYS INVENTORS
William C. Speed
James J. Dwyer
BY
Pennie, Edmonds, Morton & Barrows
ATTORNEYS

United States Patent Office 2,751,313

Patented June 19, 1956

2,751,313

PRODUCTION OF MAGNETIC SOUND TAPE

William C. Speed, Riverside, and James J. Dwyer, Stamford, Conn., assignors to Audio Devices, Inc., New York, N. Y., a corporation of New York Original application December 21, 1950, Serial No. 201,974. Divided and this application December 21, 1950, Serial No. 201,981

12 Claims. (Cl. 117—66)

This invention relates to the production of magnetic recording tape and has for its object improvements in the method of and apparatus for testing such tape during its production to assure a product of high quality.

This application is a division of copending application, Serial No. 201,974 filed December 21, 1950, simultaneously herewith. As therein disclosed, the tape base is passed successively through a series of zones, such as charging or feeding, adhesive pre-coating (if desired), pre-coat drying, magnetic coating, magnetic coat drying, magnetic testing, discharging and winding, etc. The present application is primarily concerned with the method of and apparatus for testing the coated tape base magnetically to determine whether such characteristics of the coating such as thickness and quality are of predetermined value and if not to make whatever adjustments are necessary in the magnetic coating operation to provide a coating meeting such standards.

In the production of magnetic sound recording and reproducing tape it is customary to pass a relatively long and narrow tape base successively through one or more coating and drying zones, one side of the tape base being coated with a layer of free-flowing magnetic material while moving through the coating zone. Various tape base materials are used, such as paper, plastics, etc., the most common being paper and cellulose acetate. Various magnetic materials may be used for the coating, the one most commonly used at the present time being very finely divided magnetic oxide of iron, but one that is produced artificially because its quality can be be better controlled. A dispersion of the magnetic material in a suitable vehicle or carrier is prepared, the vehicle usually containing a solvent; such as toluol, isopropyl acetate, etc. The dispersion, while free-flowing, has a viscosity conducive to the laying down of a coating of given thickness on the tape base which remains substantially intact during the drying operation. The solvent is volatilized during the drying operation, leaving a solid but pliable residue of the magnetic material on the tape base.

In order to facilitate and to improve adherence of the magnetic material on the tape base, the surface of the tape base to be coated with the magnetic material may be pre-coated with a suitable adhesive material, such as a copolymer of polybutadiene with acrylonitrile, the methyl esters of acrylic acid, etc. The magnetic material is then laid on the adhesive surface and subjected to drying.

During either or both coating operations, the tape base is passed through a gap between a bottom support and the discharge opening of a feed hopper containing the coating material, so that the coating is applied to the tape base as it moves through the gap. In the magnetic coating operation, the tape base is preferably passed horizontally through the gap across the top of and in sliding contact with the bottom support.

In the drying operation, the coated tape base is moved progressively over a series of rollers or guide supports in a drying chamber. The tension of the coated tape base tends to vary transversely and the tape base to curl so that special precautions are taken to inhibit such tendencies.

Magnetic sound recording tape should have a coating of magnetic material of optimum uniform transverse thickness. Since the coating is an extremely thin one, it is extremely difficult to assure the application of a layer of magnetic material on the tape base that meets such a specification solely by adjusting and measuring the size of the gap between the bottom of the feed hopper and the top of the bottom support. An adjustment of the gap may be obtained, for example, that will provide a layer of magnetic material of a desired thickness along one marginal edge portion of the moving tape base, whereas the layer may be thinner or thicker along the other marginal edge portion. It is impossible to detect the difference visually and it is hardly practicable to do it mechanically, such as by a measuring device.

Another difficulty encountered in practice is due to a change in quality of the magnetic material. This may occur for example when the supply of magnetic material is runing low and a new batch of magnetic material is introduced into the system. If the new batch varies in quality, the variation is reflected in the sound-recording and sound-reproducing characteristics of the tape coated with magnetic material from the new batch. Even though the gap between the bottom of the feed hopper and the top of the bottom support is set to provide a layer of magnetic material of uniform predetermined thickness, the variation in sound-recording and sound-reproducing characteristics nevertheless takes place.

Investigation has led to the discovery that such difficulties may for the most part be readily overcome. If the coating is not of uniform predetermined thickness, or if the coating is of uniform but not predetermined thickness, or if the thickness of the coating varies transversely of the tape base, or if the quality of the magnetic material in the coating varies, these adverse facts or discrepancies may be quickly determined as the tape base moves in its path of travel. The adverse facts having been determined, suitable adjustments are quickly made in the coating operation to correct the discrepancies so that high quality magnetic recording tape is produced as the tape base continues in its path of travel.

These and other advantages of the invention will be more readily understood by referring to the accompanying drawings, taken in conjunction with the following description, in which.

Figures 3, 4, 5, 6, 7, 8:
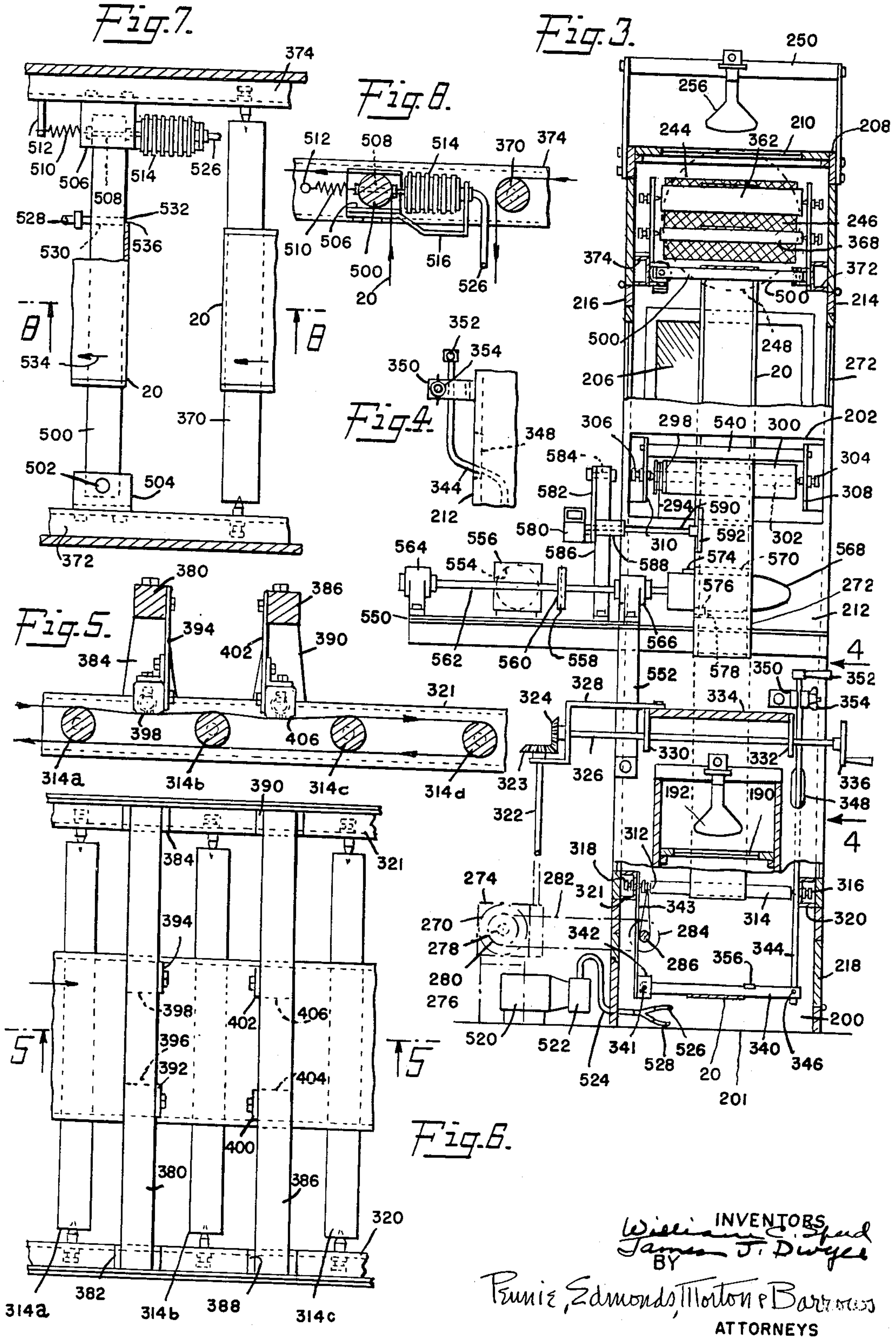
Fig. 3 is a section on the line 3—3 of Fig. 1B showing portions of the final drying and discharge zones, including an adjustable guide support for the coated tape base.
Fig. 4 is a fragmentary elevational view on the line 4—4 of Fig. 3 showing an adjusting rod for the guide support.
Figs. 5 and 6 are fragmentary views of the interior of the final drying chamber, showing magnetic testing portions of the apparatus, Fig. 5 being a sectional view on the line 5—5 of Fig. 6 and Fig. 6 a plan view.
Figure 11:
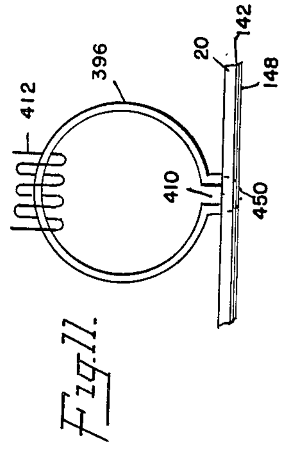
Figure 9:
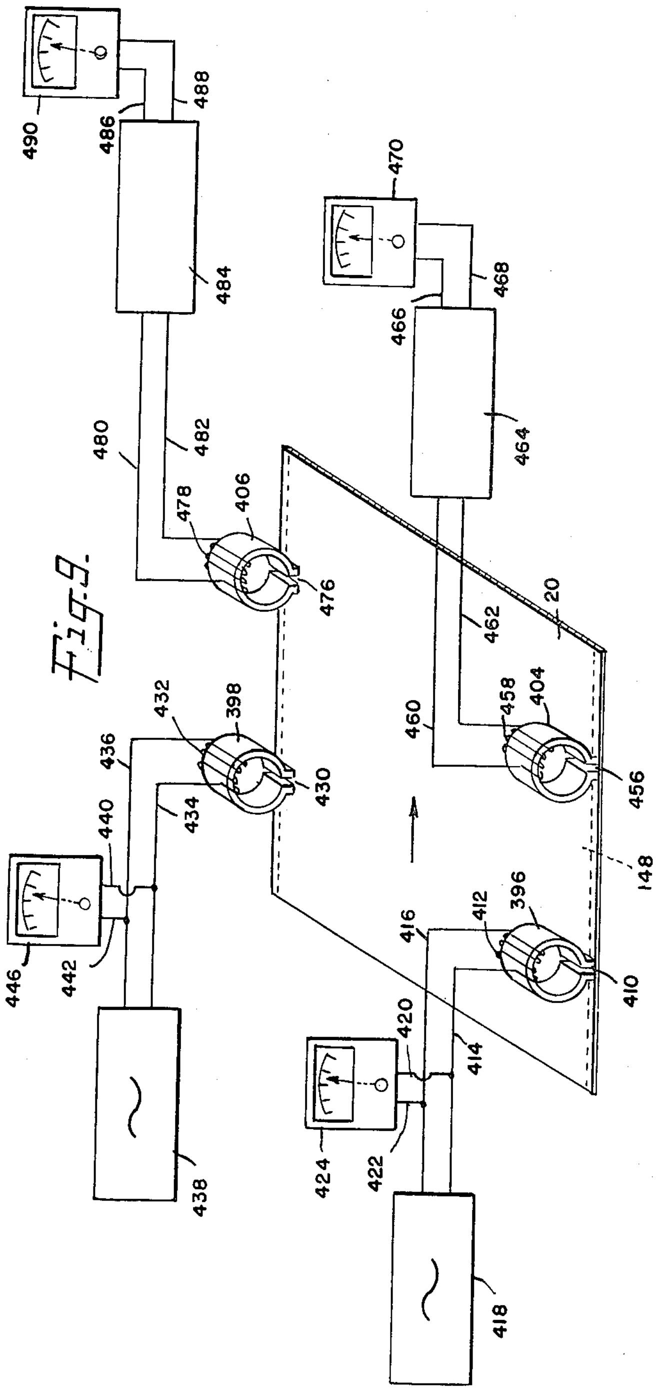
Figure 10:
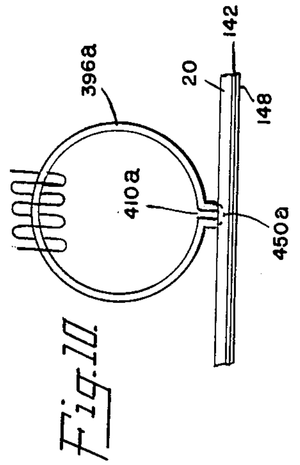

Figs. 7 and 8 are fragmentary views of a tape base aligning device in the final drying chamber, Fig. 7 being a plan view and Fig. 8 a sectional view on the line 8—8 of Fig. 7; and Figs. 9, 10 and 11 are detailed views of the magnetic testing portions of the apparatus, shown generally in Figs. 5 and 6.

Figures 1A, 2A:
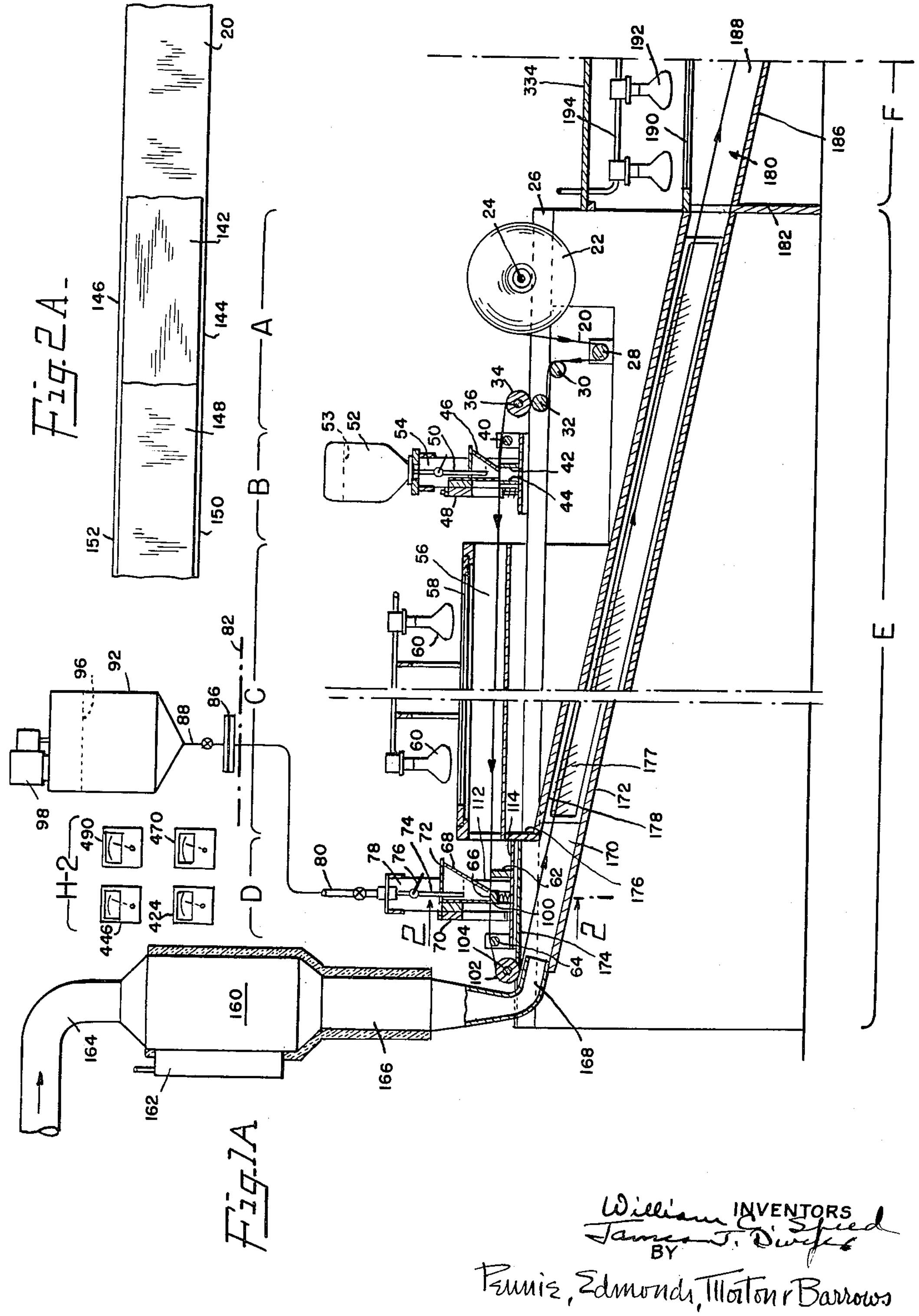
Figs. 1A and 1B are longitudinal sectional elevations of a form of apparatus illustrative of a practice of the invention.
Fig. 2A is a plan view of a piece of tape base showing uncoated, adhesive coated and magnetic coated portions.
Figures 1B, 2:
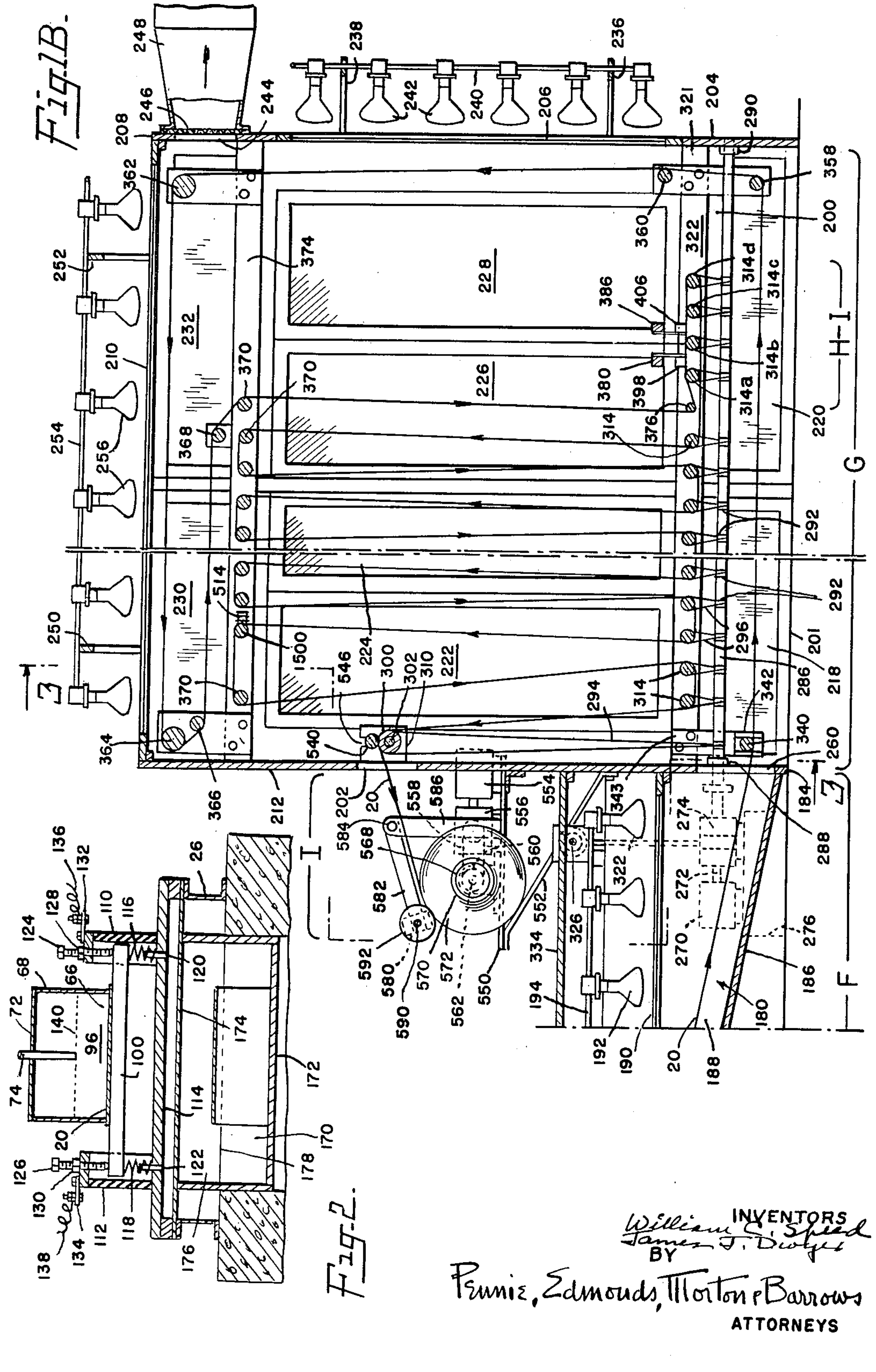
Fig. 2 is an enlarged section on the line 2—2 of Fig. 1A, showing further details of the magnetic coating device.

Referring first to Figs. 1A and 1B, the apparatus shown is divided into: (1) a tape base charging zone A; (2) an adhesive pre-coating zone B; (3) a radiant-heat pre-coat drying zone C; (4) a magnetic coating zone D; (5) a heated-air preliminary drying zone E; (6) a heated-air radiant-heat preliminary drying zone F; (7) a heated-air radiant-heat final drying zone G; (8) magnetic testing zone H–1 (Fig. 1B) and H–2 (Fig. 1A); and (9) a tape base discharging winding zone I.

As will be explained in more detail below, the tape base is passed successively through (1) the tape base charging zone A, where it is carefully unwound from its roll; (2) the pre-coating zone B, where its upper surface is treated with a liquid adhesive material; (3) the radiant-heat pre-coat drying zone C, where some of the solvent is removed from the adhesive coating; (4) the magnetic coating zone D, where a coating of magnetic material, such as oxide of iron, is applied to the adhesive coating; (5) the heated-air preliminary drying zone E, where some of the solvent in the magnetic coating is removed; (6) the heated-air radiant-heat preliminary drying zone F, where more solvent is removed from the magnetic coating; (7) the heated-air radiant-heat final drying zone G, where the final stage of the drying operation takes place; (8) the magnetic testing zone H–1 and H–2, where the adequacy of the magnetic coating as to thickness and quality are determined; and (9) the discharging zone I, where the dried coated tape base is wound into a roll.

The apparatus specifically disclosed in the drawings will be described in the order just outlined; that is, from the first to the last zone:

Referring first to Fig. 1A, a tape base 20 of any suitable material, such as cellulose acetate, paper, etc., in the form of a roll 22 is mounted on a shaft 24 supported by a frame 26. The tape base extends over rollers 28, 30, 32 and 34, the latter roller being mounted on a shaft 36 terminating at one end in a flywheel, not shown, a guide 40 and a pair of coating supports 42 and 44.

The discharge opening of an adhesive feed hopper 46, supported by a bracket 48, depends between the pair of coating supports. A valved conduit 50 extends upwardly from the feed hopper to a container 52 of adhesive material 53 supported on a frame 54. If desired a coating of adhesive material is applied to the upper side of the tape base as it moves in wiping engagement with the bottom of the hopper, across its discharge opening. The tape base preferably is somewhat wider than the discharge opening so that its narrow marginal side portions remain uncoated.

The adhesive coated tape base extends through a precoat drying chamber 56, open at both ends for the passage therethrough of the tape base. The top of the chamber is fitted with a glass window 58, over which are mounted radiant heaters 60, such as infra-red lamps, so that radiant heat may pass into the chamber to dry the adhesive coating partially as the tape base proceeds through the chamber.

The partially dried adhesive coated tape base advances to a coating device formed in general of a pair of spaced guide supports 62 and 64 approximately in alignment with the discharge opening 66 of a feed hopper 68 supported at its rear by a bracket 70. A removable cover 72 on the hopper is slotted to receive a vertically disposed conduit 74 with a regulating valve 76. The conduit is secured to a vertical support 78 extending at its lower end to the frame. This conduit communicates with a second valved conduit 80 which in the instant construction extends through a ceiling 82 to the floor above.

The second conduit connects with a filter 86. While any suitable filter may be used the current one is in the form of two juxtaposed hollow members containing several layers of fabric filters, such as filter paper, stretched between the two hollow members. The filter is adapted to catch undesired solids that might otherwise find their way into the feed hopper and hence on the tape base.

A third valved conduit 88 connects the filter with the bottom of a mixing or stirring vessel 92 having a shaft depending from its top; the shaft being provided with a plurality of paddles arranged in different angles to each other in order more effectively to stir or mix magnetic coating material 96 contained therein. The upper end of the shaft extends through the top and is operatively connected with a motor 98. A closable opening is provided in the top for introducing a dispersion of magnetic material, such as magnetic oxide of iron.

It seems that no matter how carefully the tape base is made, or processed preparatory to coating with the magnetic material, as it approaches feed hopper 68 raised or lowered portions on its upper or lower side, or both, in the form of pimples, berries or blisters, for example, are encountered which not only affect the passage of the tape base underneath the hopper, but also the sound-recording and sound-reproducing characteristics of the tape. If the obstruction is fairly large, the tape base may jam against the hopper and be torn or otherwise damaged. The tearing of the tape base at this stage leads to highly undesirable complications. The magnetic dispersion flows out of the hopper and over-runs the adjacent apparatus; the momentum of the on-coming tape base causes it to pile up; the precoating operation is, of course, impaired; and the entire operation must be stopped. If the obstruction does not tear the tape base, irregularities in the coating occur which greatly impair sound recording and hence sound reproduction. It is imperative that the finished tape base have a magnetic coating of optimum uniform thickness.

Special means are provided, therefore, to prevent tearing of the tape base and to overcome abnormal irregularities in the coating. To this end a bottom support 100 for the tape is provided below the feed hopper, which may be said to be free-floating because it can drop sufficiently to permit the obstruction to pass underneath without tearing the tape base and to signal an operator so that he may mark promptly the affected spot for subsequent treatment to be described below; as more fully disclosed in said copending applications.

It will be noted that tape base 20 passes over the top of guide support 62 and then over adjustable bottom support 100 disposed directly below discharge opening 66 of feed hopper 68 and from there to and over guide support 64.

Guide supports 62 and 64 are about the same height and are so arranged with respect to the bottom of feed hopper 68 and bottom support 100 that a gap of predetermined minimum uniform height is provided and maintained between the top of tape base 20, or the top of bottom support 100, and the bottom of the hopper so that a coating of magnetic material of optimum thickness may be applied to the top of the tape base as it moves under the hopper.

A roller 102 is placed below the level of guide support 64 and is preferably made of such material as rubber so that it may grip the underside of the coated tape base. The roller is tightly mounted on a shaft 104 one end of which terminates in a flywheel, not shown. Roller 102 with its flywheel and roller 34 with its flywheel keep tape base 20 under tension and uniform speed, thus helping to assure optimum coating operations.

For further details of the magnetic coating device, brief reference may be made to Fig. 2 where it will be seen that adjustable bottom support 100 extends across and well beyond the ends of discharge opening 66 in feed hopper 68, intermediate a pair of insulated open box supports 110 and 112 secured at their bottoms to platform 114 attached to the top of the frame. The adjustable bottom support rests at its ends on coil springs 116 and 118 held in vertical position by base rods 120 and 122 integrally secured to the top of the platform. Adjusting screws 124 and 126 extend downwardly through threaded holes in the tops of the open box supports into contact with the top of the adjustable bottom support. They are provided with lock nuts 128 and 130.

This construction permits adjustment of the bottom support with respect to the bottom of feed hopper 68 by turning the screws and lock nuts suitably so that a gap of predetermined minimum uniform height may be provided and maintained between the top of the bottom support and the bottom of the hopper to place a magnetic coating of uniform thickness on the tape base. As shown tape base 20 is slightly wider than the feed hopper so that narrow marginal edge portions of the tape base extend beyond the sides of the discharge opening of the feed hopper and therefore remain uncoated. The narrow marginal edge portions conform in general to the narrow marginal edge portions which receive no adhesive coating. Once such a gap is established between the feed hopper and the adjustable bottom support, it cannot be made smaller; unless of course the screws and lock nuts are disturbed.

But such a gap can be made larger by urging the bottom support downwardly against the coil springs. This happens when an obstruction on the tape base arrives between the hopper and the bottom support. The obstruction, whether to the side or in the center of the tape base, whether single or multiple, whether on the top side or the bottom side of the tape base, depresses the bottom support and rides under the hopper without tearing the tape base; unless, of course, the obstruction is abnormally large, which seldom is the case.

As already indicated means are also provided to advise the operator that such an obstruction has reached the hopper. While such means may take various forms, a suitable device for the purpose is disclosed in said copending applications. Being made of metal, bottom support 100, and adjustable screws 124 and 126 may be utilized as conductors of electrical current in a relay having terminals 132 and 134 secured to the open box supports, the terminals in turn being connected to leads 136 and 138 connecting with the remainder of the device, not shown.

In order briefly to illustrate the operation of such signal means, it may be assumed that a portion of tape base 20 approaching feed hopper 68 contains one or more obstructions, such as a pimple, berry or blister of tape base material itself, or one or more foreign particles attached thereto. Since the coating of magnetic material on the tape base must be of substantially uniform optimum thickness, and that thickness amounts to only a few thousandths of an inch, it is apparent that the obstruction need not be very large in order to strike the bottom of the hopper, if the obstruction is on the top of the tape; or to strike the top of the bottom support, if the obstruction is on the bottom of the tape base.

It is imperative, therefore, that the mechanism employed be extremely sensitive so that the obstruction will pass between the hopper and bottom support without tearing the tape base and so that the presence of the obstruction is announced. Since bottom support 100 floats freely on sensitive coil springs 116 and 118, it is quickly and easily depressed or dropped to permit passage of the obstruction. Such dropping of the bottom support breaks the electrical contact between the lower end of adjusting screw 124 and the top of the bottom support, or breaks the contact between the lower end of adjusting screw 126 and the top of the bottom support, or both. This breaking of contact is utilized to operate a signal which attracts the attention of the operator.

On hearing or otherwise noting the signal, the operator promptly inspects the coated portion of the tape base passing beyond the magnetic feed hopper to detect the precise location of the obstruction. He then attaches a marker on that part of the tape base, usually by means of a small adherent tab protruding beyond the edge of the tape base, so that the affected portion may be easily located later. The affected portion is usually cut out, which may be done by removing a transverse section of the coated tape base. The resulting two ends of the main tape base, having a coating of the desired uniform thickness, are carefully spliced. This may be done, for example, by joining the two ends in an angular straight line, end to end, not overlapping, relationship, with an adhesive piece of splicing tape overlapping the two ends on the uncoated side of the tape base.

Since adjustable bottom support 100 is very sensitively balanced, the supply of magnetic coating material 96 in feed hopper 68 is advantageously maintained at an optimum level 140. This level, for example, may be directly at the bottom of supply conduit 74 and may be maintained with regulating valve 76. The weight or pressure of the magnetic material on the tape base moving under the bottom of the hopper, and hence the weight or pressure on the bottom support, remains substantially constant. The bottom support is balanced in such manner as just to be able to support the moving tape base and the supply of magnetic material in the feed hopper without being depressed. Such depressing or dipping of the bottom support as occurs is therefore attributable to obstructions on the tape base when they strike the feed hopper or the bottom support, or both.

So far as basic coating operations are concerned, it may be well at this point briefly to summarize what occurs by referring to Fig. 2A. Tape base 20 as it moves through the pre-coating zone receives an adhesive coating 142 intermediate narrow marginal edge portions 144 and 146, which remain uncoated. As the partially dried adhesive coated tape base moves through the magnetic coating zone it receives a magnetic coating 148 intermediate narrow marginal edge portions 150 and 152, which remain uncoated and which advantageously are of the same width as the other marginal edge portions. In other words, the magnetic coating is placed on the adhesive coating, the two coatings having substantially the same width. In a later operation, the uncoated marginal edge portions are cut off and discarded, the coated intermediate portion only being retained.

Returning for the most part to Fig. 1A and also Fig. 1B, it will be noted that the heated-air preliminary drying zone E extends from the left to the right, below the four zones already discussed, at an inclined angle downwardly toward the floor. The drying apparatus is formed of a heater 160 provided with electrical means 162 for heating a supply of air entering inlet 164 at the top of the heater and passing through an outlet 166 at the bottom of the heater through an elbow extension 168 into a duct 170. A blower and a filter, not shown, are included so that air free of lint, dust and other foreign particles may be forced successively into and through the duct and the other drying zones in the series.

The duct is formed of a bottom 172, a top comprising sections 174, 176 and 178 tightly fitting against each other to prevent escape of substantial amounts of heated air. The bottom portion of roller 102 and the portion of freshly coated tape base adjacent thereto dip into a narrow opening in top section 174. The duct is also provided with a side wall to the rear and a side wall to the front, each being fitted with a window door 177 to provide ready access to the interior of the duct and to permit the operator or operators to see the coated tape base passing therethrough. The coated tape base is suspended between and out of contact with the walls of the duct. As the coated tape passes through the duct, heated air flows concurrently therewith to effect preliminary drying of the fresh coating.

Duct 170 communicates with the heated-air radiant-heat preliminary drying apparatus formed in general of a duct 180 supported in part by vertical walls 182 and 184, and enclosed except at the ends by a bottom 186, a rear side wall, and a front side wall, each being equipped with a window door 188, and a top provided with a glass window 190. A plurality of electrically heated lights 192, such as infra-red lamps, are mounted on a conduit 194 directly above and centrally of the top window. This arrangement permits radiant-heat to pass directly through the window onto the partially air-dried coating on the tape base passing through the duct, thus drying the coating still further.

Duct 180 communicates with the heated-air radiant-heat final drying apparatus formed in general of a relatively large rectangularly shaped chamber 200, defined at the bottom by a floor 201, a far end wall 204 having a window 206, a top 208 having a window 210, a near end wall 212 and front and back side walls 214 and 216, both side walls being fitted with lower doors 218 and 220, middle window doors 222, 224, 226 and 228 and upper doors 230 and 232.

Far end wall 204 is provided with laterally extending and spaced supports 236 and 238 to which is secured a vertical conduit 240 located centrally of window 206. A plurality of electrically heated lamps 242, such as infra-red lamps, spaced from each other at relatively short intervals are secured to the vertical support. The upper portion of the far end wall is provided with an exit opening 244 fitted with a screen 246, and around which is secured an outlet pipe 248 preferably communicating with the outside atmosphere.

Top 208 is provided with vertically extending and spaced supports 250 and 252 to which is secured an electric conduit 254 extending centrally of top window 210. A plurality of electrically heated lamps 256, such as infra-red lamps, are secured to the latter support.

Near-end wall 212 is provided at its bottom with an opening 260 to permit passage of the coated tape base from duct 180 to drying chamber 200. The end wall is also provided with a discharge opening 202 intermediate its top and bottom to permit passage of the dried coated tape base from the drying chamber to the tape base discharging zone I.

Special power driven means (Figs. 1B and 3) are provided to move the tape base through the zones so far discussed. They comprise a motor 270, a shaft 272, a gear reducer 274 mounted on a foundation 276 near end wall 212 of the drying chamber, a shaft 278, a sprocket wheel 280, an endless drive chain 282, a sprocket wheel 284, and a drive shaft 286 extending inside and lengthwise of the chamber near its bottom and back side walls, the latter shaft being supported in journals 288 and 290 attached to end walls 212 and 204.

The drive shaft contains a series of spaced belt guide grooves 292, each of which is fitted with a drive belt; the first belt in the series from left to right, as one views Fig. 1B, being a long belt 294 and the others being short belts 296. The long belt fits (Fig. 3) over and in a belt guide groove 298 at the far end of a discharge roller 300, preferably made of a gripping material, such as rubber, mounted on a shaft 302 held in horizontal position by adjustable pivot members 304 and 306 carried by supports 308 and 310 attached to front and back side walls 214 and 216. The short belts fit over and in a belt guide groove 312 at the far end of each of a corresponding series of rollers 314 horizontally suspended between adjustable pivot members 316 and 318 carried by longitudinal supports 320 and 321 attached to the front and back side walls. All of the belts are to the far side of and beyond the path of travel of the coated tape base. Rotation of drive shaft 286 by motor 270 is adapted, therefore, to rotate directly rollers 300 and 314.

The speed of rotation of the directly driven rollers needs to be under accurate control so that an optimum speed may be adopted for a given set of operating conditions. For example, the nature of the coating itself, its formula, its thickness, the nature and efficiency of the drying media, the mechanical arrangement of the guide supports, rollers and other factors influence the rate of drying of the coating and the accuracy with which the coated tape base advances in its appointed path of travel. It is imperative, therefore, that an optimum surface speed of the advancing tape base be determined and maintained.

To this end the apparatus includes (Fig. 3) a control device formed in general of a vertical shaft 322 connecting at its lower end with gear reducer 274 and at its upper end with a bevel gear 323. This bevel gear is in mesh with another bevel gear 324 connected to a transverse rod 326 supported by brackets 328, 330 and 332 attached to a main horizontal support 334 secured (Fig. 1B) at one end to frame 26 and at the other end to end wall 212. In present practice this latter support also functions as a work bench for the operators. The near end of the transverse rod is fitted with a crank wheel and handle 336. The turn of the crnak wheel permits adjustment of the gear reducer, so that the speed of drive shaft 286 and hence of power driven rollers 300 and 314 is adjustable.

So that the moving tape base may have a relatively long detention period in the chamber, at least one long enough for adequate drying of the coating, a series of other rollers and one or more guide supports are provided at strategic places in the chamber. Thus, an adjustable guide support 340 is provided at the entrance of the final drying chamber, in the lower left hand corner as one views Fig. 1B. It is used to center and help maintain the tape base in its predetermined path of travel as it advances from roller to roller in the chamber. While the one shown is a non-rotating rod, a roller could, of course, be employed. The guide support is pivotally mounted (Fig. 3) at its far end 341 to a U-shaped bracket 342 secured to a plate 343 in turn fastened to support 321. A vertically disposed rod 344 is pivotally secured to the near end 346 of the guide support. It is bent to extend through a slot 348 in near end wall 212 to the exterior of the chamber (Figs. 3 and 4). The upper end of the rod extends into and through a clamp 350 and terminates in a handle 352. The clamp is provided with a wing nut 354. This construction permits (Fig. 3) vertical adjustment of the rod and hence angular adjustment of guide support 340 in a vertical plane. A marker 356, such as a piece of tape, is placed on or near the top of the guide support with one edge of the marker in alignment with the near edge of the tape base, or where that edge of the tape base normally should be, when moving accurately in its path of travel. This helps the operator to adjust the transverse position of the guide support angularly so that the tape base is transversely in uniform contact with the guide support and will be properly centered as it proceeds to succeeding rollers.

From guide support 340 at the lower left hand corner of the chamber (Fig. 1B) the coated tape base passes to roller 358 at the lower right hand corner of the chamber. This causes the coated tape base to run substantially parallel to and a short distance above the bottom of the chamber for most of its effective length. A roller 360 located a short distance above the latter roller cooperates with a roller 362 in the upper right hand corner of the chamber to help direct the coated tape base vertically along side of end window 206 to receive radiant heat from lamps 242. A roller 364 in the upper left hand corner of the chamber cooperates with roller 362 to direct the coated tape base horizontally along side of top window 210 to receive radiant heat from lamps 256. A roller 366 located a short distance below and slightly to the right of roller 364 deflects the coated tape base horizontally to roller 368; and thence downwardly at an inclined angle for a short distance to a roller 370, which is one of a series of similar rollers mounted (Fig. 3) on horizontal supports 372 and 374 secured to front and back side walls 214 and 216. These rollers are particularly designed to cooperate with power driven rollers 314.

While a specific description of the manner in which the rollers just discussed are mounted is not given, it will be clear that a good deal of latitude is permissible in this regard. It is, of course, primarily important that the rollers be aligned at right angles to the moving tape base in substantially uniform contact therewith and that the rollers rotate easily. This helps to maintain equal tension on the tape base, thus inhibiting objectionable curling, and to keep the tape base moving in its normal path of travel.

Several expedients, in addition to those thus far discussed, advantageously are employed to assist the operator in getting a coating uniform in thickness and quality on the tape base and to keep the coated tape base in accurate alignment on the rollers. In other words, these additional structural features are highly useful in obtaining a superior agnetic recording tape.

Taking up first the matter of securing a coating uniform in thickness and quality, it will be noted on referring to Fig. 1B and reading from left to right that the last four in the series of power driven rollers 314 near the bottom of the chamber do not have cooperating rollers in the series of rollers 370 near the top of the chamber; and that due to a guide support or roller 376, relatively small in cross-section, located between the top and bottom levels of those four power driven rollers, the coated tape base is brought in contact with the tops as well as the bottoms of the driven rollers. So far as the tests to be described are concerned this particular arrangement is not necessary but it is the apparatus now in use and it is operative in practice.

The four power driven rollers in question are designated **314*a*, 314*b*, 314*c* and 314*d*. Now, referring to Figs. 5 and 6, which detail some of the structural features to better advantage, it will be noted that a cross-support 380 extends between and above rollers 314*a* and 314*b*, which is attached at its ends to the tops of vertical posts 382 and 384 secured at their bottoms to longitudinal supports 320 and 321; and that a similar cross-support 386 extends between and above rollers 314*b* and 314*c*, which is attached at its ends to the tops of vertical posts 388 and 390 secured at their bottoms to longitudinal supports 320 and 321**.

Returning to cross-support 380, a pair of spaced brackets 392 and 394 depend therefrom. They are spaced on the cross-support so as to overhang the edge portions of the coated tape base. Magnetic charging heads 396 and 398 are mounted at the bottoms of the depending brackets in such a position as to contact and slightly to depress the tape base between rollers **314*a* and 314*b***. The magnetic charging heads are quite similar to the magnetic recording heads used on current magnetic tape recording machines, and are adapted to energize magnetically the running portion of the coated tape base within their field, as will be described in more detail below.

In a similar manner, a pair of spaced brackets 400 and 402 depend from cross-support 386. Magnetic pick-up heads 404 and 406 are mounted at the bottoms of the depending brackets in such a position as to contact and slightly depress the tape base between rollers **314*b* and 314*c***. The magnetic pick-up heads are quite similar to the charging heads and to the magnetic pick-up or sound reproducing heads used on current combination magnetic recording and sound reproducing machines. They are adapted to pickup magnetic energy from the running portions of coated tape base just energized by the charging heads, which energy may be measured and appraised as will be described below.

On tracing the course of the coated tape base in Figs. 1A and 1B from magnetic coating hopper 68 in zone D to rollers **314*a*, 314*b*, 314*c* and 314*d* in zones G and H–1, it will be noted that as the tape base leaves the hopper its top surface contains the coating; that this becomes the undersurface as the tape base advances through drying zones E and F; and that in zone G the coating is kept out of contact with guide support 340 and rollers 358, 360, 362, 364 and 366; that the coating then contacts an object for the first time, namely, rollers 368 and 370 but not 376; and that the coating then contacts the tops and bottoms of rollers 314*a*, 314*b*, 314*c* and 314*d*. This arangement permits a relatively long path of travel and hence a substantial amount of drying of the coating before it contacts rollers 368 and 370**.

Since rollers at that stage of the final drying operation have no harmful effect on the coating when in rolling contact therewith and since magnetic heads 396, 398, 404 and 406 (Figs. 5 and 6) would have a harmful effect on the coating when in rubbing contact therewith, the rollers and the magnetic heads are so arranged as to cause the coated surface of the tape base to be in rolling contact with rollers **314*a*, 314*b*, 314*c* and 314*d*** and the reverse uncoated surface of the tape base to be in rubbing contact with the magnetic heads.

Figs. 9, 10 and 11 may now be referred to in further explanation of the foregoing. Tape base 20 is shown as moving from left to right (as also in Figs. 1B, 5 and 6) with its magnetic coating 148 at the bottom and magnetic heads 396, 398, 404 and 406 at the top of the tape base in contact therewith. In other words, the magnetic heads are in contact with the uncoated surface of the coated tape base. As more particularly shown in Fig. 9, charging head 396 is provided with a gap 410 adjacent the coating and a wire coil 412, the ends of which terminate in main leads 414 and 416 connecting with a source of electricity 418. Branch leads 420 and 422 connect the main leads with a meter 424. In a similar manner charging head 398 is provided with a gap 430 adjacent the coating and a wire coil 432, the ends of which terminate in main leads 434 and 436 connecting with a source of electricity 438, advantageously the same as the other source. Branch leads 440 and 442 connect the main leads with a meter 446.

Since magnetic charging heads 396 and 398 are in contact with the uncoated side of the coated tape base, the magnetic field produced around gaps 410 and 430 must be somewhat larger than would be the case in conventional methods of sound recording when the magnetic recording heads are brought in contact with the magnetic coating. In other words, the magnetic field produced by the present charging heads must be sufficiently large to penetrate not only the body of the tape base itself but also its undercoating of magnetic material. This is illustrated in Figs. 10 and 11. For purposes of illustration, magnetic head **396*a* in Fig. 10 may be considered as having a narrow gap 410*a*, substantially the same as that used in a conventional magnetic recording head. Magnetic field 450*a* does not adequately penetrate the tape base, if at all. It does not, therefore, adequately energize magnetic undercoating 148**, if at all.

In the case of Fig. 11, on the contrary, gap 410 is substantially wider than gap **410*a*—thus assuring the generation of a magnetic field 450 sufficiently large and strong completely to penetrate both the body of tape base 20 and its undercoating 148 of magnetic material. This is necessary, as it is in the case of charging head 398 and its gap 430**, in order adequately to charge the running side portions of the coated tape base magnetically for the pickup tests.

The meters are placed where they may be seen readily by the operator. In Fig. 1A, they, but not the leads thereto, are shown above the magnetic feed hopper. They are preferably mounted on a panel.

In operation current of desired wavelength is derived from sources 418 and 438 to energize charging heads 396 and 398 so that the coating on the portions of the tape base adjacent thereto may be charged with adequate signal strength. The charging heads are identical so far as possible so that each may discharge signals of the same strength. In other words, so far as possible the two charging heads are operated under the same conditions. If necessary they may be suitably calibrated to obtain this result. Meters 424 and 446 are useful in determining whether there is a change in quality of the magnetic material. A change in signal strength from a standard value indicates a change in quality. So far as the magnetic energization of the coating is concerned, therefore, the main remaining variables will be in the thickness of the coating as between the two marginal edge portions of the coated tape base. Any difference in magnetic energization of the coating at the margins should, therefore, be reflected in the pick-up tests that follow.

Returning to Fig. 9, pick-up head 404 is provided with a gap 456 adjacent the coating and a wire coil 458, the ends of which terminate in main leads 460 and 462 connecting with an amplifier 464. Leads 466 and 468 in turn connect the amplifier with a meter 470. In a similar manner pick-up head 406 is provided with a gap 476 adjacent the coating and a wire coil 478, the ends of which terminate in main leads 480 and 482 connecting with an amplifier 484. Leads 486 and 488 in turn connect the amplifier with a meter 490.

As in the case of the gaps of the charging heads, the gaps of the pick-up heads must be sufficiently wide to compensate for the thickness of the body of the tape base as well as the coating. They must be able to encompass enough of the magnetically energized field in the coating on the underside of the tape base to pick up sound signals (field strength) truly representative of the strength of the magnetically energized marginal side portions of the coating. As it is the signals picked up are amplified for convenient indication by the pointers of meters 470 and 490.

For comparison purposes the pick-up heads, like the charging heads, are identical so far as possible so that the main variables encountered are the thickness of the coating itself, and the quality of the coating, such as its magnetic material content, the dispersion of the magnetic material in the coating, etc. The pick-up heads may be calibrated to assure identical operating efficiency.

The pointers of meters 424 and 446 for charging heads 396 and 398 point to the same values, thus indicating that both side portions of coating 148 are being charged with identical amounts of magnetic energization. The pointers of meters 470 and 490 for pick-up heads 404 and 406 also point to the same values, thus indicating that both marginal side portions of the coating are delivering identical amounts of magnetic energization. The latter fact further indicates that both marginal side portions of the coating are identical in thickness and quality, and that all is well with the magnetic coating operation in zone D (Fig. 1A). If the coating there applied to the tape base has an optimum uniform thickness and is uniform in quality, present practice shows that that optimum uniform thickness and quality are maintained on the tape base as it passes under the charging and pick-up heads. Operating conditions are ideal, therefore, and such as the operators seek to establish and maintain.

While such ideal operations normally can be fairly well maintained after they are initiated, some adjustment is usually necessary when starting operations and sometimes during the midst of operations. In any event, the magnetic tests under consideration are highly useful in determining whether all is well so far as uniform thickness of coating and quality are concerned; and, if not, in indicating what adjustments are necessary in the coating operation to obtain or reobtain a coating of uniform thickness and quality.

Thus, if the reading on meter 470 varies from that on meter 490, the operator is at once advised that the thickness of the coating under pick-up 404 is not the same as that under pick-up head 406. He, therefore, goes to zone D to make whatever adjustments are necessary in the coating step to obtain a coating of uniform thickness. If, for example, the meter readings indicate that the coating is thinner under pick-up head 404 than under pick-up head 406, the operator (Figs. 1A and 2) turns adjusting screw 124 on the same marginal side of the tape base properly to depress that end of bottom guide support 100. To this end lock nut 128 is turned upwardly and the adjusting screw is then turned downwardly. The amount of turning in both instances is very small because the ultimate coating desired is itself quite thin. In any event the adjustment increases the depth of the gap between that side of feed hopper 68 and the bottom guide support, thus increasing the thickness of the coating at that marginal side of the tape base.

The operator (Fig. 1A) then observes what effect his adjustment has on the pick-up meter readings. The meters are placed advantageously near the feed hopper so that he can make the readings readily. He must, of course, allow enough time for the adjusted coated portion of the tape base to reach the magnetic heads. This does not take long, depending of course on the speed of travel of the tape base; and he soon observes a change in the reading for meter 470. The new reading will indicate whether the adjustment was sufficient, insufficient or excessive. If not the former, he makes another adjustment. By trial and error the operator soon obtains a proper adjustment. If the discrepancy in thickness or quality of coating is substantial, the affected part of the coated tape base is discarded.

From the foregoing, it will be clear that the operator relies on the meter readings to guide him in making whatever adjustments are necessary in the coating operation to assure a coating of uniform thickness. To regulate adjustment screws 124 and 126 of the magnetic feed hopper, he is guided almost entirely by the meter readings; and they can be made easily and quickly.

As already indicated, the coating may be of uniform thickness but not in quality. This occurs, for example, when the magnetic material coming from the feed hopper changes in quality, due perhaps to the introduction of a batch of magnetic material differing substantially in quality from that previously introduced. The meter readings promptly indicate such a change in quality and the operator can be guided accordingly.

Taking up next the matter of keeping the coated tape base in accurate alignment on the rollers, it will be noted on referring to zone G of Fig. 1B, and reading from right to left, that after the coated tape base leaves the magnetic charging and pick-up heads just discussed, it passes up and down and progressively advances from a power driven roller 314 in the series below to a roller 370 in the series above until it reaches a rounded aligning guide 500 disposed between the first and second rollers 370, on reading from left to right, in the upper series. The aligning guide differs in construction from rollers 370 and is specially designed to help keep the coated tape base in alignment on rollers that precede and follow it.

Aligning guide 500 and its accompanying structure are detailed in Figs. 3, 7 and 8. Unlike rollers 370 in the upper series, the aligning guide is not suspended at its ends between pivot members, for example, like roller 370 in Fig. 7. The aligning guide, however, is pivoted near one end by a vertical pin 502 to a bracket 504 attached to horizontal support 372 so that the guide may move about the pin angularly in a horizontal plane. The other end of the guide is slidably mounted in a channel 506 secured to horizontal support 374. A rod 508 extends horizontally through and is attached to that end of the guide. One end of a spring 510 is attached to one end of the rod and the other end of the spring is attached to an anchor 512 secured to horizontal support 374. The other end of the rod is attached to a bellows 514 carried by an underslung bracket 516 (Fig. 8) secured to the underside of the channel.

Now, turning to Fig. 3, it will be noted that a motor 520 is operatively connected to a suction or exhaust fan 522 from which extends a main suction conduit 524 which terminates in two branch conduits 526 and 528. The first branch conduit (Figs. 7 and 8) extends upwardly to and connects with bellows 514. The second branch conduit (Fig. 7) extends upwardly to and connects with a passageway or hollow tube 530 extending completely through and attached to aligning guide 500 intermediate its ends, but nearer the far end with the bellows. The open end of the passageway or hollow tube terminates in a small hole 532 in the right side of the aligning guide against which the tape base slides as it rises to and passes over the guide, in the direction of arrow 534. The hole is located where the far outside edge 536 of the adjacent portion of coated tape base 20 should be passing when properly centered on the guide.

The function of the structure just described is to keep the edge of the far marginal side of the tape base continually over the hole and hence to keep the moving tape base centrally aligned on the guide as well as on rollers that precede and follow the guide. This is possible because of the automatic manner in which the guide may be pivoted. Before going into the automatic phase of the operation, however, it may be helpful first to consider what happens when the guide is operated manually. If the guide is pivoted to the right, as one views Fig. 3, it exerts greater pressure on the far marginal side than on the near marginal side of the tape base, thus causing the tape base to move laterally toward the near side; namely, away from hole 532. If the guide is pivoted to the left, reverse conditions obtain. Pressure of the guide on the tape base is lessened at the far marginal side, and the tape base then creeps toward that side; namely, over hole 532. The tension of spring 510 is such as normally to keep the guide pivoted slightly to the left, so that the tape base tends to creep toward the far end of the guide; namely, over the hole.

It may now be assumed that motor 520 is operating so that suction or exhaust fan 522, main conduit 524 and branch conduits 526 or 528 are placed under suction when conditions call for suction. Whether branches 526 and 528 are under suction at a given moment depends on the condition of hole 532.

If, for example, the hole is only partially covered, say half-covered, the branch conduits will not be under effective suction because air is drawn into the hole and down its branch conduit 528. This air, therefore, prevents the development of effective suction in that branch as well as in branch 526, thus leaving the guide pivoted slightly to the left of what may be called dead center; its normal position under the tension of the spring.

If, next, the far marginal side of the tape base moves over to cover the hole, branch conduits 526 and 528 are placed under suction. This suction reduces the air pressure in bellows 514, thus causing them to contract. When this occurs, the guide pivots to the right and the tape base creeps toward the near end of the guide support; namely, away from the hole. Since the hole is then only partially covered, air enters branch 528 and the suction in both branches 526 and 528 is broken. The spring then pulls the guide back to its former position, slightly left of dead center. As this occurs, the tape base creeps toward the far end of the guide, thus again gradually covering the hole. Branches 526 and 528 are then placed under suction, causing the guide to pivot back to its former position slightly right of dead center.

In other words, aligning guide 500 swings back and forth like a pendulum, its arc of swing, however, being very small; and the tape base oscillates from side to side, its range of movement likewise being very small. Since the hole is quite small and it need be only partially uncovered to break the vacuum in the branch conduits, the pendulum movement of the guide and the side to side movement of the tape base are hardly perceptible by the eye. They have the effect, however, of keeping the tape base in its prescribed path of travel; which effect, moreover, tends to be transmitted to preceeding and following rollers.

Going back to zone G of Fig. 1B, it will be noted that the coated tape base leaves adjusting guide 500 for the first roller 370 in the upper series, reading from left to right; then passes down and under the first two power driven rollers 314 in the lower series, again reading from left to right; and next moves up and over power driven discharge roller 300 at discharge opening 202 in near-end wall 212. It will be recalled (Fig. 3) that the discharge roller is mounted on shaft 302 carried by side supports 308 and 310 attached to front and back side walls 214 and 216 of the final drying chamber.

A hold-down roller 540 (Figs. 1B and 3) of adequate weight extends transversely across the top of the discharge roller. It rests by gravity, and therefore exerts a holding force, on the coated tape base passing over the discharge roller. The ends 542 and 544 (Fig. 3) of the hold-down roller are smaller in diameter than the main portion and fit in drop-slots 546 (Fig. 1B) in side supports 308 and 310 (Fig. 3), the slots acting merely as retainers for the hold-down roller ends and being sufficiently deep so that the hold-down roller is supported freely on the discharge roller and the two rollers together are adapted to grip the coated tape base. This becomes important, for example, when it is desired to separate the portion of coated tape base already discharged from the drying chamber from the oncoming portion. The tape base outside of discharge opening 202 may be cut without fear that the end next to the opening will be drawn back into, and cause a piling up of oncoming coated tape base in, the final drying chamber. The arrangement described permits cutting of the tape base discharged from the drying chamber and at the same time keeping the oncoming tape base within the drying chamber under its normal tension.

Again returning to Fig. 1B, coated tape base 20 passes from discharge roller 300 and hold-down roller 540 through opening 202 in the end wall of the final drying chamber to discharge zone I to be wound into a roll. The apparatus for this purpose includes a platform 550 and a brace 552 attached below the opening to the end wall of the chamber; a motor 554 operatively connected to a gear reducer 556 with a shaft and a sprocket wheel; an endless drive chain 558 (Fig. 3) mounted on the sprocket and a second sprocket wheel 560 mounted on a shaft 562 supported in journals 564 and 566; the right end of the shaft, as one views Fig. 3, being free and integrally fitted with a core 568 adapted to fit in and be keyed in a hub 570 around which the coated tape base is wound into a roll 572. The core is provided with an integral stop 574 and an integral key 576, spaced oppositely from one another. The hub is in turn provided with a key-way 578 adapted to receive the core key.

The apparatus also includes a footage counter 580 secured to the lower end of a bracket 582 pivotally mounted at its upper end 584 to the upper end of an upright post 586 secured at its bottom to the platform. A journal 588 is secured to the bracket, through which extends a shaft 590 operatively connected at its left end to the counter and at its right end to a friction disc 592, covered for example with rubber, resting on and adapted to be turned by the roll of coated tape. Due to the manner in which the bracket is pivoted, the disc, and hence the shaft and counter, rises as the roll of coated tape base increases in size.

If desired, uncoated roll 20 of tape base may be converted entirely into a coated roll 572; that is, the overall length of the coated roll will be substantially the same as that of the uncoated roll. In practice it is usually desirable to start operations with a relatively large uncoated roll and to obtain therefrom a number of smaller coated rolls of specified footage. Footage counter 580 is useful for the purpose. When the coated roll reaches the desired amount of footage, the coated tape base is cut transversely as it leaves discharge opening 202 in the final drying chamber.

A few preliminary steps are advantageously taken: Motor 554 is stopped, hub 570 is loosened from core 568 and its key 576; roll 572 and its hub are pulled toward the near end, away from the core; another hub is keyed to the core; the coated tape base is cut as it continues to leave the discharge opening; the free end of the tape is secured to the hub; the motor is started and speeded to take up the slack portion of coated tape base outside of the discharge opening; and the speed of the motor is then adjusted to wind the coated tape base at its normal rate on the new roll.

If, as indicated above, an obstruction on the tape base impairs the thickness of the coating of magnetic material deposited thereon as the tape base passes under magnetic feed hopper 68 and over adjustable bottom support 100, the operator, in response to a signal initiated thereby, locates the obstruction and places a marker, such as a tab, over the peripheral portion of the coated tape base for easy detection. Also, if the magnetizing tests described above show sections of the tape base to be improperly coated, they are similarly marked by the operator. The coated roll of tape base after drying is unwound to lay bare the section or sections affected. They are cut out and the ends of the main portion of the tape base are suitably spliced, preferably in end to end, butt-end, relationship so that the thickness of the coating at the splice joint is of the same uniform thickness as the remainder of the tape base.

In a present practice of the invention, the tape base is six inches wide. Each roll of coated tape base, after drying and after the affected sections are removed and the free ends are spliced, is cut as it is unwound into a plurality of pieces of tape of desired width and each piece of tape so cut is wound simultaneously into a separate roll of desired footage.

We claim:

1. In the method of producing magnetic sound-recording and sound-reproducing tape by passing a relatively long and narrow non-magnetic tape base successively through a coating zone and a drying zone, one side of the tape base being coated with a layer of free-flowing liquid dispersion of magnetic oxide of iron while moving through the coating zone and the coating being dried while moving through the drying zone, the improvement which comprises magnetically testing the coated tape base after the coating is at least partially dried and as the tape base moves in its path of travel away from the coating zone to determine whether the coating has a predetermined thickness, and adjusting the thickness of the layer of magnetic material being applied to the tape base in the coating zone until the magnetic tests on the advancing tape base indicate a coating of such predetermined thickness, said testing and adjusting steps being conducted while the tape base is in transit at its normal rate of speed.

2. Method according to claim 1, in which the magnetic testing is conducted through the uncoated side of the coated tape base.

3. Method according to claim 1, in which the magnetic testing is conducted separately at the marginal portions of the coated tape base to determine whether the coating has a uniform thickness transversely of the tape base, and the thickness of the layer of magnetic material applied to the tape base at the corresponding marginal portions in the coating zone is adjusted until the magnetic tests indicate a coating transversely of the tape base having such uniform predetermined thickness.

4. Method according to claim 1, in which the magnetic testing is conducted separately through the marginal portions of the uncoated side of the coated tape base to determine whether the coating has a uniform predetermined thickness transversely of the tape base, and the thickness of the layer of magnetic material applied to the tape base at the corresponding marginal portions in the coating zone is adjusted until the magnetic tests indicate a coating transversely of the tape base having such uniform predetermined thickness.

5. In the method of producing magnetic second-recording and sound-reproducing tape by passing a relatively long and narrow non-magnetic tape base successively through a coating zone and a drying zone, one side of the tape base being coated with a layer of free-flowing liquid dispersion of magnetic oxide of iron while moving through the coating zone and the coating being dried while moving through the drying zone, the improvement which comprises magnetically testing the coated tape base after the coating is at least partially dried and as the tape base moves in its path of travel away from the coating zone to determine whether the coating has a field strength of predetermined value, and adjusting the amount of the magnetic material going into the layer applied to the tape base in the coating zone until the magnetic tests on the advancing tape base indicate a coating of such predetermined field strength, said testing and adjusting steps being conducted while the tape base is in transit at its normal rate of speed.

6. Method according to claim 5, in which the magnetic testing is conducted through the uncoated side of the coated tape base.

7. Method according to claim 5, in which both marginal portions of the coating are separately magnetized, and the field strengths of both magnetized marginal portions are separately determined.

8. Method according to claim 5, in which both marginal portions of the coating are separately magnetized from the uncoated side of the coated tape base.

9. Method according to claim 5, in which the field strengths of both magnetized marginal portions are separately determined from the uncoated side of the coated tape base.

10. Method according to claim 5, in which both marginal portions of the coating are separately magnetized from the uncoated side of the coated tape base, and the field strengths of both magnetized marginal portions are separately determined from the uncoated side of the coated tape base.

11. Method according to claim 5, in which the field strength tests are conducted in the drying zone.

12. Method according to claim 1, in which the thickness tests are conducted in the drying zone.

References Cited in the file of this patent

UNITED STATES PATENTS

| | | |
|---|---|---|
| 449,670 | Denney | Apr. 7, 1891 |
| 1,182,013 | Hunter | May 9, 1916 |
| 1,653,467 | O'Neill | Dec. 20, 1927 |
| 1,785,370 | Thomas | Dec. 16, 1930 |
| 1,815,915 | Kallander | July 28, 1931 |
| 1,883,559 | Chipman | Oct. 18, 1932 |
| 1,978,405 | Boyce | Oct. 30, 1934 |
| 2,023,019 | Heppes | Dec. 3, 1935 |
| 2,103,134 | Akahira | Dec. 21, 1937 |
| 2,304,818 | Grupe | Dec. 15, 1942 |
| 2,332,945 | St. Hilaire | Oct. 26, 1943 |
| 2,415,644 | Leonhard et al. | Feb. 11, 1947 |
| 2,569,755 | Griffith | Oct. 2, 1951 |
| 2,571,488 | Rooney | Oct. 16, 1951 |
| 2,588,973 | Fitch et al. | Mar. 11, 1952 |

FOREIGN PATENTS

| | | |
|---|---|---|
| 466,023 | Great Britain | May 18, 1937 |
| 511,164 | Great Britain | Oct. 28, 1937 |

OTHER REFERENCES

Burns et al.: Protective Coatings for Metals, 1939, page 244.